(12) United States Patent
Hofer et al.

(10) Patent No.: US 11,804,710 B2
(45) Date of Patent: Oct. 31, 2023

(54) ARC DETECTION

(71) Applicant: Fronius International GmbH, Pettenbach (AT)

(72) Inventors: Bernd Hofer, Pettenbach (AT); Christian Fasthuber, Pettenbach (AT); Franz Fischereder, Pettenbach (AT); Stefan Breuer, Pettenbach (AT); Walter Spitzer, Pettenbach (AT); Mario Bairhuber, Pettenbach (AT); Reimar Pfeil, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 479 days.

(21) Appl. No.: 17/263,396

(22) PCT Filed: Jul. 26, 2019

(86) PCT No.: PCT/EP2019/070225
§ 371 (c)(1),
(2) Date: Jan. 26, 2021

(87) PCT Pub. No.: WO2020/021088
PCT Pub. Date: Jan. 30, 2020

(65) Prior Publication Data
US 2021/0159687 A1 May 27, 2021

(30) Foreign Application Priority Data
Jul. 27, 2018 (EP) ..................................... 18186047

(51) Int. Cl.
*H02J 1/06* (2006.01)
*H02H 1/00* (2006.01)
(Continued)

(52) U.S. Cl.
CPC ............. *H02J 1/06* (2013.01); *H02H 1/0015* (2013.01); *H02H 1/0076* (2013.01); *H02J 3/381* (2013.01);
(Continued)

(58) Field of Classification Search
CPC ........ H02J 1/06; H02J 3/381; H02J 13/00002; H02J 2300/24; H02H 1/0015;
(Continued)

(56) References Cited

U.S. PATENT DOCUMENTS 5,065,072 A * 11/1991 Albou ................ H05B 41/2885
315/83
5,459,630 A 10/1995 MacKenzie et al.
(Continued)

FOREIGN PATENT DOCUMENTS

CN 1877976 A 12/2006
CN 104052032 A 9/2014
(Continued)

OTHER PUBLICATIONS

Int'l Search Report (Form PCT/ISA/210) conducted in Int'l Appln. No. PCT/EP2019/070225 (dated Sep. 18, 2019).
Int'l Written Opinion (Form PCT/ISA/237) conducted in Int'l Appln. No. PCT/EP2019/070225 (dated Sep. 18, 2019) (translation).
(Continued)

Primary Examiner — Dharti H Patel
(74) Attorney, Agent, or Firm — GREENBLUM & BERNSTEIN, P.L.C.

(57) ABSTRACT

The aim of the invention is to detect an arc in an assembly for transmitting a direct voltage. This aim is achieved by a communication transformer having a primary winding and a secondary winding, the secondary winding being connected to a transmitting device, which is designed to impress a communication signal onto the secondary winding of the communication transformer, and the primary winding being connected to one of the direct voltage lines in order to feed (Continued)

a communication signal transformed by the communication transformer to one of the direct voltage lines. In order to detect, in the assembly, the arc signal caused by an arc, the secondary winding is connected to an arc detection unit, which is designed to detect an arc signal transformed by the communication transformer.

11 Claims, 3 Drawing Sheets

(51) Int. Cl.
  *H02J 3/38* (2006.01)
  *H02J 13/00* (2006.01)
(52) U.S. Cl.
  CPC ..... *H02J 13/00002* (2020.01); *H02J 2300/24* (2020.01)
(58) Field of Classification Search
  CPC ....... H02H 1/0076; Y02E 60/00; Y02E 40/70; Y04S 10/30; Y04S 10/123
  USPC .......................................................... 361/42
  See application file for complete search history.

(56) References Cited

U.S. PATENT DOCUMENTS

| | | | |
|---|---|---|---|
| 9,559,516 | B2 | 1/2017 | Phadke |
| 2008/0258645 | A1* | 10/2008 | Han ................... H05B 41/2824 315/257 |
| 2013/0009483 | A1 | 1/2013 | Kawate et al. |
| 2013/0094583 | A1* | 4/2013 | Abe ..................... H04N 19/147 375/240.12 |
| 2014/0084942 | A1 | 3/2014 | Logvinov et al. |
| 2016/0013623 | A1* | 1/2016 | Zheng ................... H01T 19/04 361/263 |
| 2016/0116524 | A1 | 4/2016 | Putz |
| 2019/0079132 | A1 | 3/2019 | Chine et al. |

FOREIGN PATENT DOCUMENTS

| | | |
|---|---|---|
| CN | 105308840 A | 2/2016 |
| DE | 10 2014 104 205 | 10/2014 |
| DE | 102016119877 A1 | 4/2018 |
| EP | 3 349 317 A1 | 7/2018 |
| WO | 2017/149038 | 9/2017 |

OTHER PUBLICATIONS

Extended European Search Report dated Dec. 23, 2022, in the parallel European patent application No. 22191931.9-1202.

\* cited by examiner

ARC DETECTION

The present invention relates to an assembly for transmitting a direct voltage from a direct voltage source via at least two direct voltage lines to at least one direct voltage sink, a communication transformer being provided which has a primary winding and a secondary winding, the secondary winding being connected to a transmitting device, which is designed to impress a communication signal onto the secondary winding of the communication transformer, and the primary winding being connected to the direct voltage line in order to feed a communication signal transformed by the communication transformer to one of the direct voltage lines, a signal processing circuit being connected between a secondary winding of the secondary side and the arc detection unit, the signal processing circuit being designed to prepare a secondary alternating current which flows through the secondary winding for the arc detection unit. The present invention also relates to a method for detecting an arc signal generated by an arc in an assembly for transmitting a direct voltage from at least one direct voltage source via a direct voltage line to at least one direct voltage sink, a communication signal being switched to a secondary side of a communication transformer and a transformed communication signal being fed into the direct voltage line via a primary winding of the communication transformer, an arc signal transformed by the communication transformer being processed to detect the arc signal in the assembly.

In direct voltage systems, a direct voltage is provided by at least one direct voltage source and transmitted to a direct voltage sink via direct voltage lines. For example, a number of solar panels or solar cells of a photovoltaic system or a battery can be provided as direct voltage sources. The direct voltage is generated on the solar panels or solar cells depending on solar radiation. An inverter, for example, can act as a direct voltage sink. An inverter converts the direct voltage into an alternating voltage and can feed this into an electrical supply network or provide the generated alternating voltage to an electrical load, such as an electrical machine or a battery.

In many assemblies, communication with the existing direct voltage sources and/or direct voltage sinks is desirable. Communication signals transmitted by a control unit can be used, for example, to synchronize individual solar panels. Communication signals can also be used to switch off direct voltage sources or other elements of the assembly, in particular when a fault occurs. Communication signals can thus be transmitted, for example, via specially provided communication lines or directly via the existing direct voltage line by means of power line communication (PLC). In the case of power line communication, it is known that the communication signals are modulated to the basic signal available for energy transmission and transmitted with the direct voltage as the basic signal. The receiving unit can recover and evaluate the modulated communication signal by means of demodulation.

In the event of a fault, parasitic arcs can be ignited in direct voltage systems. Arcs are formed by a voltage between two mutually spaced elements. Thus, two elements can initially be in electrical contact. However, if said electrical contact is faulty or interrupted, there will be a gap between the two elements. The high electrical voltage ionizes the air located between the two elements (which initially had an insulating effect), which can create an arc. However, an arc can also be caused by a defective insulation material (e.g. air pockets) between two elements that have a high potential difference. A breakdown occurs through the insulation material, which forms an arc. Arcs usually do not extinguish by themselves and must therefore be actively extinguished, for example by deactivating the voltage source. Detecting arcs, however, is a fundamental challenge, because often only an ignition of the arc can be detected, but a burning arc often remains undetected. After ignition, the arc signal would have to be distinguished from the noise that occurs, which was not possible when using previously known methods. When the arc burns, it has a low level and may not show any transient changes over time.

It is therefore necessary, in particular in photovoltaic systems, to detect arcs and then switch off the system quickly and safely. Extra hardware is therefore usually required for arc detection. US 2014/084942 A1, for example, discloses an arc detection which becomes active during the transmission pauses in power line communication. However, US 2014/084942 A1 does not provide any information about the exact design of the arc detection unit. DE 10 2014 104 205 A1, on the other hand, discloses a photovoltaic system in which power line communication takes place via a transformer connected to the direct voltage line. In addition, a detection circuit for detecting arcs is provided in an inverter. The inverter is connected to the photovoltaic system via a separator consisting of windings and a switch contact and can also receive PLC signals via the separator.

An object of the present invention is that of implementing arc detection in an assembly for transmitting a direct voltage, which causes the least possible hardware expenditure.

According to the invention, this object is achieved by an assembly in which, in order to detect an arc signal caused by an arc, the secondary side of a communication transformer is connected to an arc detection unit which is designed to detect an arc signal transformed by the communication transformer, a signal processing circuit being connected between a secondary winding of the secondary side and the arc detection unit, the signal processing circuit being designed to process a secondary alternating current flowing through the secondary winding for the arc detection unit. The object is also achieved by a method in which, in order to detect the arc signal in the assembly, an arc signal transformed by the communication transformer is processed and a secondary alternating current flowing through the secondary winding is processed for arc detection. An arc signal caused by the arc can thus be used to detect the arc, even if the arc has already been ignited.

A communication transformer already present in the assembly can thus be used to transform the arc signal into a transformed arc signal. The communication transformer is initially used to transform a communication signal applied to the secondary winding by a transmitting device to a primary winding connected to the direct voltage line, the transformed communication signal being transmitted via the direct voltage line. A communication transformer is usually arranged in the negative direct voltage line. This is especially the case when at least two direct voltage sources and/or two direct voltage sinks are provided in the assembly, since at least two positive direct voltage lines are also provided as a result. Because the communication transformer is provided in the common negative direct voltage line, it can communicate with a plurality of direct voltage sinks and/or direct voltage sources. Otherwise, a communication transformer would be required for each positive direct voltage line. However, the communication transformer can also be provided or integrated in a direct voltage sink, a direct voltage source, or a further component of the assembly, such as in an inverter, a microinverter, in an optimizer, etc.

According to the invention, the communication transformer is additionally used to transform an arc signal present on the primary winding to the secondary winding, the transformed arc signal being detected by an arc detection unit. This means that no additional transformer is required to detect the arc.

The direct voltage source can comprise at least one photovoltaic cell. The direct voltage source can thus also comprise a serial and/or parallel interconnection of photovoltaic cells or also various interconnections of other different or similar direct voltage sources such as photovoltaic storage or (intralogistics) batteries. The direct voltage sink can comprise at least one inverter. The direct voltage sink can also include, for example, electrical loads such as direct voltage/direct voltage stages, motors, lighting, etc. In the case of bidirectional assemblies in particular, for example having batteries and inverters, direct voltage sources and direct voltage sinks can also swap roles, depending on the operating mode.

The primary alternating current at the primary winding of the communication transformer is composed of the transformed communication signal and the arc signal for the event of a communication signal being transmitted and an arc occurring, and thus represents a mixed signal. The secondary alternating current on the secondary side of the communication transformer is similarly composed of the communication signal and the transformed arc signal and also represents a (transformed) mixed signal. In order to detect the arc signal caused by the arc, the communication signal can be attenuated with respect to the arc signal.

A signal processing circuit is connected between a secondary winding of the secondary side and the arc detection unit, the signal processing circuit being designed to process a secondary alternating current flowing through the secondary winding for the arc detection unit.

The signal processing circuit advantageously comprises a resistor and a capacitor which is connected in series, the capacitor being connected in parallel to the secondary winding of the secondary side and the arc detection unit being connected to the resistor in order to process a voltage across the resistor to detect the arc. Since the arc causes a high-frequency voltage, the voltage is advantageously analyzed in the frequency range, it being possible for a high-frequency sensor to be provided.

The transmitting device can be connected to the secondary winding solely in order to transform the communication signal to the primary winding. The transmitting device can also be connected, via a subtraction circuit, to a further secondary winding which receives a transformed mixed signal via the primary winding, the subtraction circuit being designed to subtract the communication signal transmitted by the transmitting device from the transformed mixed signal in order to receive the transformed arc signal and to transmit it to the arc detection unit for detection. The transformed mixed signal received by the further secondary winding is composed of the transformed arc signal and the communication signal, it being possible, of course, for further signal components, such as noise, to be part of the mixed signal. Since the (transformed) mixed signal is generated by transforming a mixed signal from the primary winding to the further secondary winding, the mixed signal is, of course, also transformed from the primary winding to the first secondary winding. In this case, however, the transformed mixed signal at the secondary winding can vary from the transformed mixed signal at the further secondary winding, for example due to varying transformation ratios of the secondary winding and the further secondary winding. The assembly of the secondary winding, further secondary winding and subtraction circuit results in a hybrid circuit. This hybrid circuit can be provided instead of the signal processing circuit coupled to the first secondary winding or in addition to the signal processing circuit.

The transmitting device is advantageously designed to transmit a communication signal, preferably a switch-off signal, to the direct voltage source and/or the direct voltage sink when an arc is detected by the arc detection unit. For this purpose, a control unit can also be provided, which is informed by the arc detection unit that an arc is present in the assembly and, as a result, transmits a corresponding communication signal via the transmitting device, for example to switch off the direct voltage sink and/or the direct voltage source and/or other elements of the assembly.

If an arc is not detected, the transmitting device can also transmit a communication signal to the direct voltage source and/or the direct voltage sink, and the transmission of the communication signal can only be stopped if an arc is detected. The communication signal can thus correspond to a keep-alive signal.

At least two direct voltage sinks and/or at least two direct voltage sources can be provided in the assembly, one current sensor for detecting the arc signal, preferably at least one low-frequency component of the arc signal, being provided on each of the at least two direct voltage sinks and/or at least two direct voltage sources in order to determine the direct voltage sink and/or direct voltage source associated with the arc.

For example, in order to detect a position of the arc in an assembly comprising at least two direct voltage sinks and/or at least two direct voltage sources, when an arc is detected by the arc detection unit, the arc signal, preferably at least one low-frequency component of the arc signal, can be detected by means of a current sensor provided on the direct voltage sink and/or direct voltage source in order to determine the direct voltage sink and/or direct voltage source associated with the arc.

If a plurality of direct voltage sources (or also a plurality of direct voltage sources) are provided, these usually share the negative direct voltage line. Since the communication transformer is usually arranged in the negative direct voltage line, an arc can be basically detected using the communication transformer. If the arc occurs in a positive direct voltage line or in a direct voltage sink and/or direct voltage source, although said arc can thus be detected by the arc detection unit, the relevant direct voltage line and/or direct voltage sink or direct voltage source cannot be identified. A current sensor located at each direct voltage sink and/or direct voltage source can provide a remedy here. If an arc is detected by the arc detection unit, then, for example, the current profile of all current sensors can be can be taken into consideration and it can thus be determined through which current sensor the arc signal flows. As a result, the position of the arc in the system can be isolated and it can be determined in which branch, i.e. in which direct voltage line, direct voltage sink or direct voltage source the arc occurs.

The present invention is described in greater detail below with reference to FIGS. 1 to 4, which show exemplary, schematic and non-limiting advantageous embodiments of the invention. In the drawings.

Figure 1:
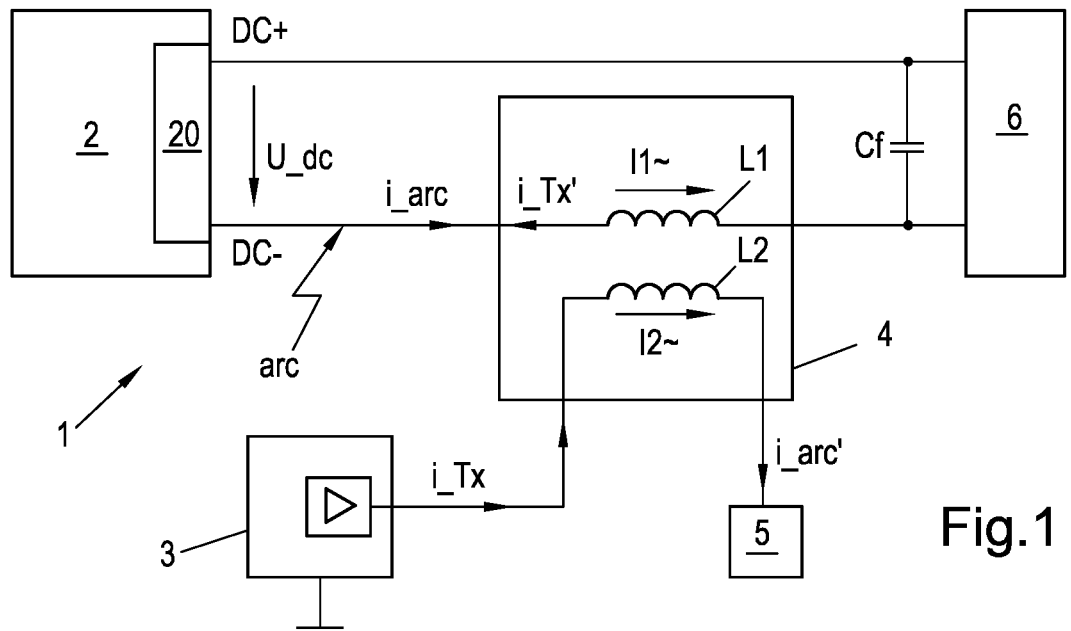
FIG. 1 is an assembly according to the invention, comprising an arc detection unit.

FIG. 1 shows an assembly 1 according to the invention for transmitting a direct voltage U_dc. A direct voltage source 2 is connected to a direct voltage sink 6 via a positive direct voltage line DC+ and a negative direct voltage line DC−. The direct voltage source 2 can, for example, comprise one or more solar cells and provides energy which is transmitted to the direct voltage sink 6 as direct voltage U_dc. The direct voltage sink 6 can, for example, comprise an inverter or a rectifier and can be used to feed into an energy supply network or to supply energy to a load. An electrical load can, of course, also be considered to be the direct voltage sink 6 directly.

In particular in photovoltaic systems, different configurations of direct voltage sources 2 and direct voltage sinks 6 can be provided; for example, each solar panel can be connected as a direct voltage source 2 to an inverter as a direct voltage sink 6 via a direct voltage line DC+, DC−. A plurality of direct voltage sources 2 and/or direct voltage sinks 6 can also share parts of the direct voltage lines DC+, DC−. Solar panels can also be connected to one another in series and/or in parallel as a direct voltage source 2. Various configurations of direct voltage sources 2, direct voltage sinks 6 and direct voltage lines DC+, DC− are thus conceivable, whereby the invention is not restricted to the configuration in FIG. 1. When using batteries, the batteries can be considered to be direct voltage sources 2 or direct voltage sinks 6, depending on whether the batteries are being discharged or charged. For example, depending on the operating mode, an inverter and/or charger can be used as a direct voltage source 2 for a battery as a direct voltage sink 6, or a battery can be used as a direct voltage sink 6 for an inverter and/or a charger as a direct voltage source 2.

Figure 2:
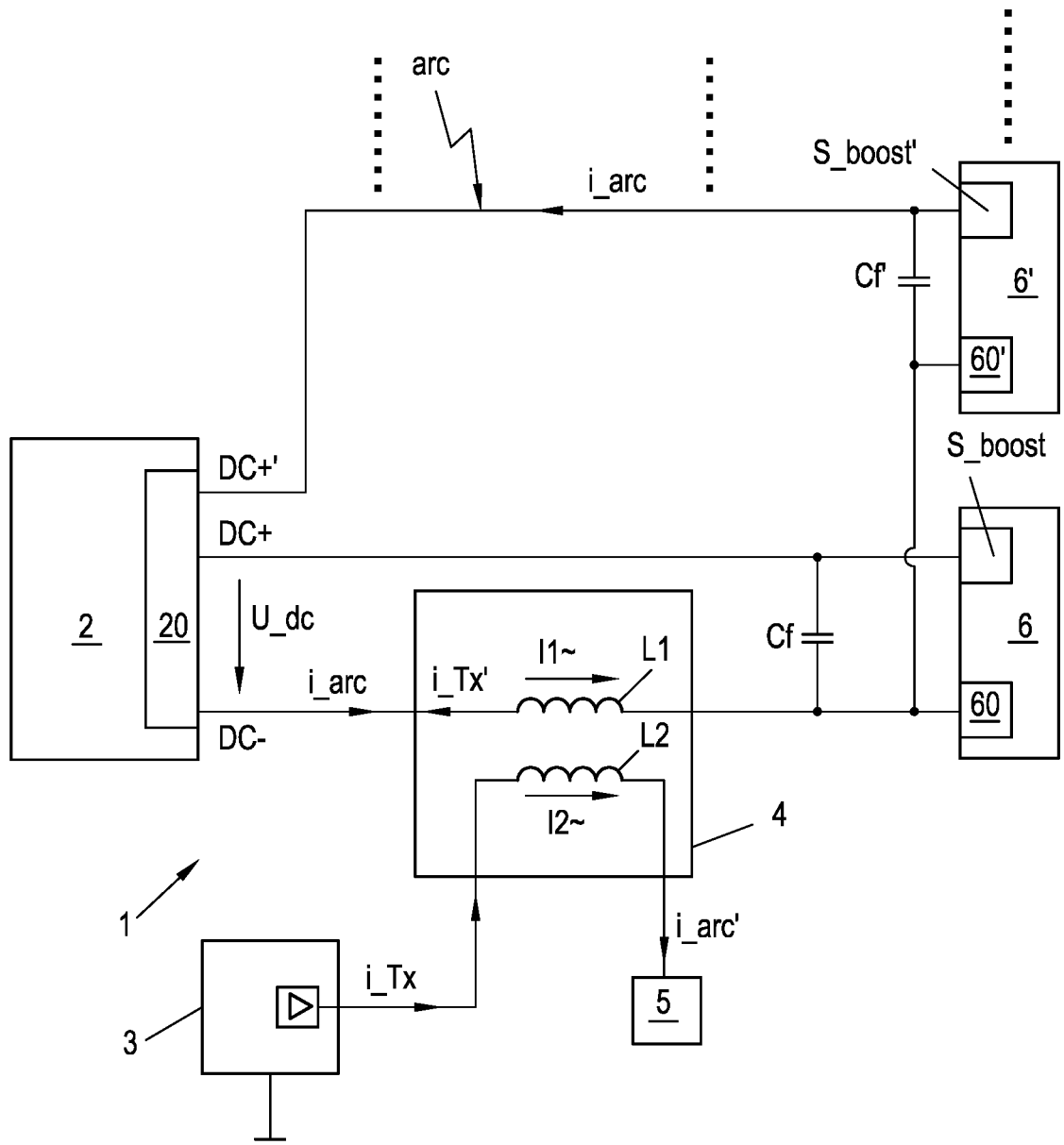
FIG. 2 is an assembly according to the invention, comprising a plurality of current sinks.

FIG. 2 shows a similar assembly comprising a direct voltage source 2, but comprising a plurality of direct voltage sinks 6, 6'. The direct voltage sinks 6, 6' share the negative direct voltage line DC− and each have an associated positive direct voltage line DC+, DC+'. Of course, a plurality of direct voltage sources 2, etc. are also conceivable in the assembly. A plurality of direct voltage sinks 6, 6' can also represent a plurality of stages of a photovoltaic system or an inverter.

In any case, a communication transformer 4 is provided in the assembly 1, which communication transformer comprises a primary winding L1 on a primary side and a secondary winding L1 on a secondary side. The primary winding L1 is connected to a direct voltage line DC+, DC−, the secondary side being connected to a transmitting device 3. The connection of the primary winding L1 to the negative direct voltage line DC− is one example; the primary winding L1 could, of course, also be connected to the positive direct voltage line DC+. In particular in assemblies comprising a plurality of positive direct voltage lines DC+, DC+', as shown for example in FIG. 2, it is routine to provide the primary winding L1 of the communication transformer 4 in the negative direct voltage line DC− such that the communication transformer 4 can communicate with all existing direct voltage sources 2 and/or direct voltage sinks 6, 6'.

A primary alternating current I1~ flowing through the primary winding L1 is transformed via the communication transformer 4 to a secondary alternating current I2~ flowing through the secondary winding L2, and vice versa. The communication transformer 4 advantageously has a transformation ratio of 1:1, 1:2 or 1:4 from the primary side to the secondary side. Furthermore, the communication transformer 4 can have a ferrite core, e.g, a Hiflux core, preferably having a particularly advantageous saturation behavior for direct currents.

A communication signal i_Tx can now be fed to the secondary winding L2 of the secondary side via the transmitting device 3 as part of power line communication. The communication signal i_Tx is thus transformed to a transformed communication signal i_Tx' via the communication transformer 4 on the primary winding L1 of the primary side. The transformed communication signal i_Tx' at the primary winding L1 is thus superimposed/modulated on the current flowing across the negative direct voltage line DC−, which, of course, influences the direct voltage U_dc. The transformed communication signal i_Tx' is thus transmitted via the direct voltage lines DC+, DC− to the direct voltage source 2 and/or the direct voltage sink 6, 6' and received and demodulated by a receiving unit 20, 60 provided on the direct voltage source 2 and/or the direct voltage sink 6, 6'. In order to close the circuit for transmitting the transformed communication signal i_Tx' via the direct voltage lines DC+, DC−, a filter capacitor Cf is preferably used in or on the direct voltage sink 6, 6' in order to loop through the transformed communication signal i_Tx'.

In FIG. 1, a receiving unit 20 is only provided on the direct voltage source 2; of course, a receiving unit 60 for the transformed communication signal i_Tx' can also or instead be provided on the direct voltage sink 6, 6'. The receiving units 20, 20' or 60, 60' can be arranged both on the negative direct voltage line DC− and on the positive direct voltage line DC+. In FIG. 2, a receiving unit 60, 60' is provided, for example, on the direct voltage source 2 and on the plurality of direct voltage sinks 6, 6'. The communication signals i_Tx can be, for example, pulses for detecting interference points, signals for measuring impedance, interference level measurement signals, synchronization signals for individual current sources 2, such as solar cells, or also control signals.

An arc can form in the assembly, for example in a direct voltage source 2, a direct voltage sink 6, 6', a direct voltage line DC+, DC+', DC−, a plug connection of the direct voltage line DC+, DC+', DC−, or another element of the assembly 1. By way of example, the arc is indicated as a lightning bolt in the negative direct voltage line DC− in FIGS. 1, 3 and 4 and as a lightning bolt in one of the positive direct voltage lines DC+' in FIG. 2. If an arc is ignited, an arc signal i_arc is generated in the direct voltage line DC+, DC+', DC−, which arc signal is superimposed on the current flowing in the direct voltage lines DC+, DC+', DC− caused by the direct voltage U_dc. According to the invention, the secondary winding L2 of the communication transformer 4 already provided for transmitting communication signals i_Tx is connected to an arc detection unit 5. An arc signal i_arc generated by the arc on the direct voltage line DC+, DC− is thus transformed from the primary winding L1 of the communication transformer 4 to a transformed arc signal i_arc', which is provided at the secondary winding L2. The arc signal i_arc is high-frequency, such that a filter capacitor Cf can be provided in or on the direct voltage sink 6 for closing the circuit. The filter capacitor is connected between the negative direct voltage line DC− and the relevant positive direct voltage line DC+, DC+'. In each of FIG. 1-4, the filter capacitor Cf is arranged on the direct voltage sink 6, 6', but can also be an integral component of the relevant direct voltage sink 6, 6'.

If an arc occurs at the same time that a communication signal i_Tx is being transmitted, the arc signal i_arc and the transformed communication signal i_Tx' add at the primary winding L1 to form the primary alternating current I1~. The communication transformer transforms the primary alternating current I~ in the primary winding L1 to the secondary alternating current I2~ of the secondary winding L2. On the secondary side, the communication signal i_Tx and the transformed arc signal i_arc' add in a similar manner to form the secondary alternating current I2~. In the case of such a superimposition, the primary alternating current I1~ and the secondary alternating current I2~ represent a mixed signal.

Of course, if no arc is formed in the assembly, neither the primary alternating current I1~nor secondary alternating current I2~ comprises an arc signal i_arc or transformed arc signal i_arc', but rather the transformed communication signal i_Tx' or the communication signal i_Tx. Of course, if no communication signal i_Tx is transmitted, neither the primary alternating current I1~ nor secondary alternating current I2~ comprises a transformed communication signal i_Tx', or a communication signal i_Tx, but rather the arc signal i_arc, or the transformed arc signal i_arc', if an arc is formed. Of course, in all configurations, both the primary alternating current I1~ and the secondary alternating current I2~ can contain further components of alternating currents, e.g. further signals, interference, etc. Thus, a communication signal i_Tx can basically be transmitted by the transmitting device 3 and an arc or a transformed arc signal i_arc' can be detected by the arc detection unit simultaneously.

Since an arc detection unit 5 is provided on the secondary side, it is not necessary to attach further complex hardware, for example a further transformer, to detect an arc. Advantageously, the transmitting device 3 can transmit a switch-off signal as a communication signal i_Tx or as a transformed communication signal i_Tx' to the direct voltage source 2 and/or the direct voltage sink 6, 6', in particular if an arc is detected by the arc detection unit 5. For this purpose, a control unit can be provided which is connected to the arc detection unit 5 and the transmitting device 3 and, when an arc is detected, receives corresponding information from the arc detection unit 5 and then causes the transmitting device 3 to transmit a communication signal i_Tx to the direct voltage source 2 and/or the direct voltage sink 6, 6', for example to deactivate the direct voltage source 2 and/or the direct voltage sink 6, 6' and thus extinguish the arc. Of course, a warning signal can also be emitted when an arc is detected. If a keep-alive signal is transmitted as the communication signal i_Tx, the direct voltage source 2 and/or the direct voltage sink 6, 6' can be deactivated if the communication signal i_Tx is no longer transmitted due to the detection of an arc. The receiving unit 20, 60 is correspondingly provided for receiving the switch-off signal or the keep-alive signal as a communication signal.

In FIG. 2, as mentioned, a plurality of direct voltage sinks 6, 6' is provided. If an arc occurs in a positive direct voltage line DC+ or in a direct voltage sink 6, 6', the arc signal i_arc is also transmitted in the negative direct voltage line DC– and, according to the invention, can be detected by the arc detection unit 5. However, no conclusion can usually be made about a position of the arc. In order to determine in which branch, i.e. in which direct voltage line DC–, DC+, DC+', or in which direct voltage sink 6, 6' (or if there are a plurality of direct voltage sources 2, in which direct voltage source 2) the arc occurs, a current sensor S_boost, S_boost' can be provided on or in the direct voltage sinks 6, 6' (and/or the direct voltage sinks 2). The current sensor S_boost, S_boost' is preferably an integral component of a direct voltage sink 6, 6'. If a filter capacitor Cf is also provided as an integral component of the direct voltage sink 6, 6', the current sensor S_boost, S_boost' can be connected into the circuit downstream of the filter capacitor Cf.

If an arc is detected by the arc detection unit 5, it can be detected in which branch the arc occurs by means of the relevant current sensor S_boost, S_boost'. This is possible because the arc signal i_arc, or at least one low-frequency component of the arc signal i_arc, only flows through this relevant current sensor S_boost, S_boost' and not through the current sensors S_boost, S_boost' which are associated with the other direct voltage sinks 6, 6'.

A current sensor that is already present at the direct voltage sinks 6, 6' can be used as the current sensor S_boost, S_boost'. In particular, inverse converters as direct voltage sinks 6, 6 have such current sensors. The current sensors S_boost alone are not able to detect a burning arc with sufficient reliability and must therefore be used in conjunction with the arc detection unit 5.

Figure 3:
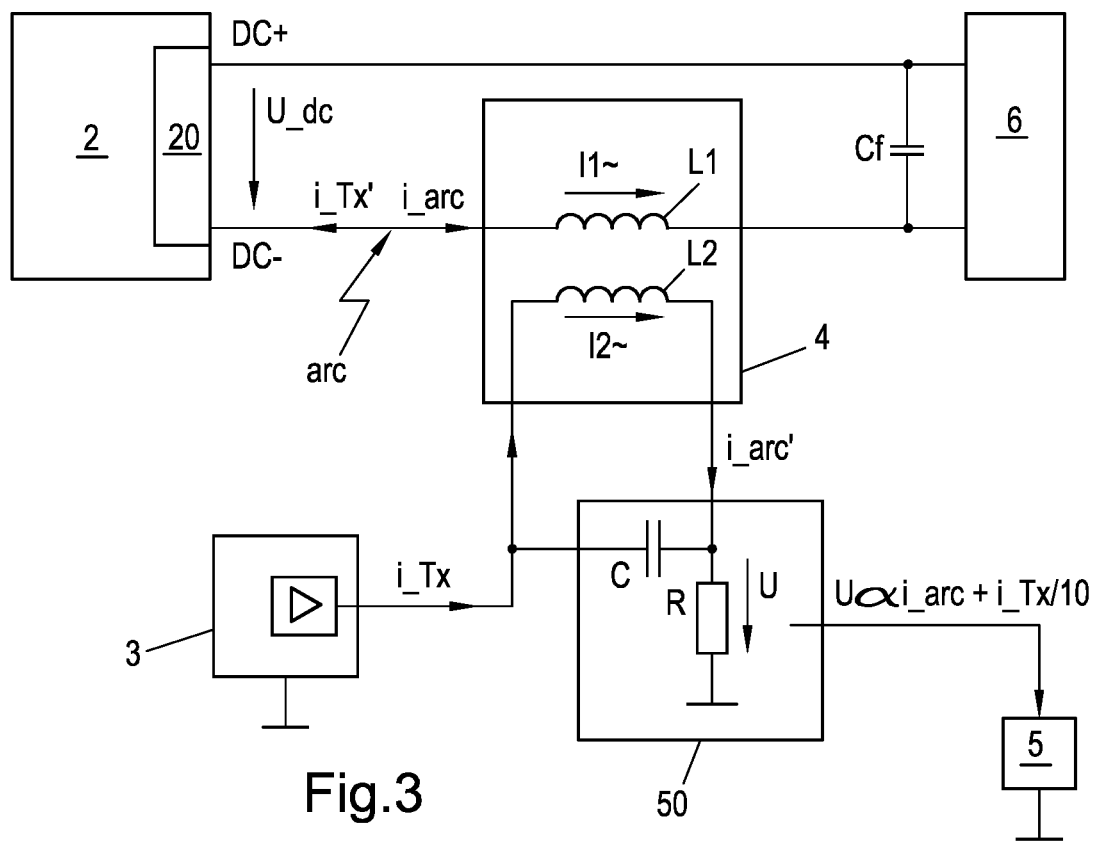
FIG. 3 is an arc detection unit comprising a signal processing unit.

FIG. 3 shows an advantageous embodiment of the invention. The communication transformer 4 has a secondary winding L2 on the secondary side and a primary winding L1 on the primary side. The primary winding L1 is connected to the direct voltage line DC+, DC–; here a signal processing circuit 50 is connected between the secondary winding L2 and the arc detection unit 5. However, the arc signal i_arc is high-frequency, and therefore it is difficult to detect in the time domain and, apart from a transient, almost appears like a direct current during ignition. The signal processing circuit 50 is therefore used to process the secondary alternating current I2~ flowing through the secondary winding L2. A simpler detection of the arc signal i_arc or the transformed arc signal i_arc' by means of the arc detection unit 5 can thus be made possible. The signal processing circuit 50 can thus advantageously be designed in such a way that an improved detection of an arc while a communication signal i_Tx is being transmitted is made possible. This can be achieved by attenuating the communication signal i_Tx with respect to the arc detection unit 5 in relation to the transformed arc signal i_arc'. A filter capacitor Cf at the direct voltage sink 6, 6', for example an input capacitor of an inverter, can be used as the direct voltage sink 6, 6'. For this purpose, the signal processing circuit 50 can comprise a resistor R and a capacitor C which is connected in series and has a preferred magnitude of 70 to 120 nF, it being possible to provide a base frequency in the kHz range, preferably 130 kHz. The capacitor C is connected in parallel to the secondary winding L2 of the secondary side; the arc detection unit 5 is also connected to the resistor R in order to process a voltage U_R across the resistor R to detect the arc signal i_arc'. Since the transmission unit 3 is also connected in series with the secondary winding, a resonance circuit is thus generated which, from the point of view of the arc detection unit 5, causes a communication signal i_Tx attenuated by up to 1/10 with respect to the transformed arc signal i_arc'. This results in a voltage U across the resistor R that is proportional to i_Tx/10+i_arc'. It is therefore possible to reliably detect a transformed arc signal i_arc' and therefore an arc occurring in the assembly 1, in particular when a communication signal i_Tx is transmitted.

Figure 4:
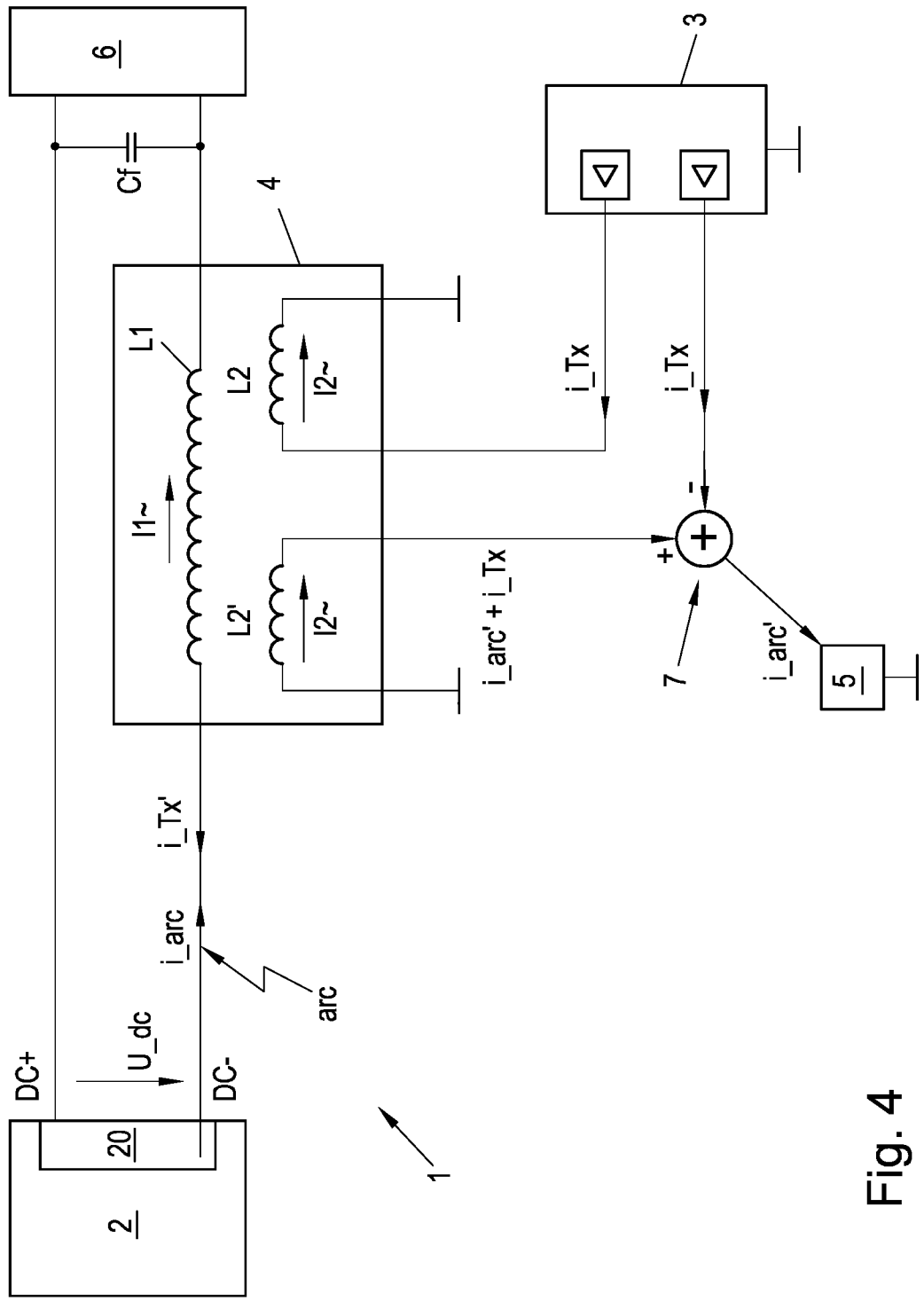
FIG. 4 is a hybrid circuit comprising a further secondary winding and a subtraction circuit.

In the embodiment shown in FIG. 3, the transmitting device 3, as well as the arc detection unit 5, is connected to the secondary winding L2. A communication transformer 4 comprising a second secondary winding L2' can also be provided as a further preferred embodiment, the transmitting device 3 being connected to the further secondary winding L2' via a subtraction circuit 7, as shown in FIG. 4. The transmitting device 3 is also connected to the secondary winding L2 in order to transform the communication signal i_Tx to the primary winding L1. This results in a hybrid circuit. The secondary winding L2' receives a mixed signal i_Tx+i_arc' via the primary winding L1, which mixed signal is composed of the communication signal i_Tx and the transformed arc signal i_arc'. The subtraction circuit 7 is designed to subtract the communication signal i_Tx transmitted by the transmitting device 3 from the received mixed signal i_Tx+i_arc' in order to thus obtain the transformed arc signal i_arc'. For this purpose, a negative input is connected to the transmitting device 3 and a positive input is connected to the further secondary winding. The transformed arc signal i_arc' can be transmitted to the arc detection unit 5 in order to detect the arc.

However, the arc signal i_arc is usually also transformed to the secondary side via the first secondary winding L2. In order to prevent an arc signal i_arc' transformed via the first secondary winding L2 from also being fed to the negative input of the subtraction circuit 7, an extra amplifier can be provided on the transmitting device—as indicated in FIG. 4—which ensures that only the communication signal i_Tx is fed to the negative input of the subtraction circuit 7. This prevents the communication signal i_Tx from being fed back, since the communication signal i_Tx is impressed separately onto the secondary winding L2 and in the subtraction circuit 7 by the transmitting device 3, which is achieved in this case by means of two separate amplifiers.

Of course, an embodiment is also conceivable which combines a signal processing circuit 50, for example according to FIG. 3, and a hybrid circuit according to FIG. 4, in order to reliably detect an arc.

The invention claimed is:

1. Assembly for transmitting a direct voltage from at least one direct voltage source via at least two direct voltage lines to at least one direct voltage sink, a communication transformer with a primary winding and a secondary winding being provided, the secondary winding being connected to a transmitting device which is designed to impress a communication signal onto the secondary winding of the communication transformer wherein the primary winding is connected to one of the direct voltage lines in order to feed a communication signal transformed by the communication transformer to one of the direct voltage lines, wherein the secondary winding is connected to an arc detection unit in order to detect an arc signal caused by an arc in the assembly, which arc detection unit is designed to detect an arc signal transformed by the communication transformer, wherein a signal processing circuit is connected between a secondary winding of the secondary side and the arc detection unit, the signal processing circuit being designed to process a secondary alternating current flowing through the secondary winding for the arc detection unit.

2. Assembly according to claim 1, wherein the at least one direct voltage source comprises at least one photovoltaic cell, and wherein the at least one direct voltage sink comprises at least one inverter.

3. Assembly according to claim 1, wherein the signal processing circuit comprises a resistor and a capacitor which is connected in series, the capacitor being connected in parallel to the secondary winding of the secondary side and the arc detection unit being connected to the resistor in order to process a voltage across the resistor to detect the arc.

4. Assembly according to claim 1, wherein the transmitting device is connected, via a subtraction circuit, to a further secondary winding which receives a mixed signal via the primary winding, wherein the subtraction circuit is designed to subtract the communication signal transmitted by the transmitting device from the mixed signal in order to receive the transformed arc signal and to transmit it to the arc detection unit for detection.

5. Assembly according to claim 1, wherein the transmitting device is designed to transmit a communication signal to the direct voltage source and/or the direct voltage sink depending on whether an arc is detected or not by the arc detection unit.

6. Assembly according to claim 1, wherein at least two direct voltage sinks and/or at least two direct voltage sources are provided, and in that a current sensor for detecting the arc signal, preferably at least one low-frequency component of the arc signal, is provided on each of the at least two direct voltage sinks and/or at least two direct voltage sources respectively in order to determine the direct voltage sink and/or direct voltage source associated with the arc.

7. Method for detecting an arc signal generated by an arc, in an assembly for transmitting a direct voltage from at least one direct voltage source to at least one direct voltage sink via at least two direct voltage lines, a communication signal being switched to a secondary winding of a communication transformer and a transformed communication signal being fed into the direct voltage line via a primary winding of the communication transformer, wherein an arc signal transformed by the communication transformer is processed in order to detect the arc signal in the assembly, a secondary alternating current flowing through the secondary winding being processed for arc detection.

8. Method according to claim 7, wherein the communication signal is attenuated with respect to the arc signal in order to detect the arc signal caused by the arc.

9. Method according to claim 7, wherein a communication signal, preferably a switch-off signal, is transmitted to the at least one direct voltage source and/or the at least one direct voltage sink when an arc is detected.

10. Method according to claim 7, wherein, if an arc is not detected, a communication signal is transmitted to the at least one direct voltage source and/or the at least one direct voltage sink, and wherein, if an arc is detected, the transmission of the communication signal is stopped.

11. Method according to claim 7, wherein, when an arc is detected by the arc detection unit, in order to detect a position of the arc in an assembly comprising at least two direct voltage sinks and/or at least two direct voltage sources, the arc signal, preferably at least one low-frequency component of the arc signal, is detected by a current sensor provided on the associated direct voltage sink and/or direct voltage source in order to determine the direct voltage sink and/or direct voltage source associated with the arc.

* * * * *